United States Patent Office 2,823,943
Patented Feb. 18, 1958

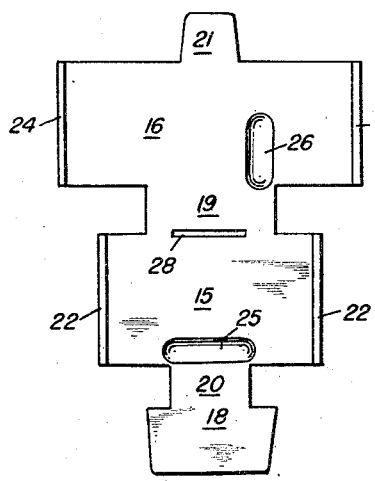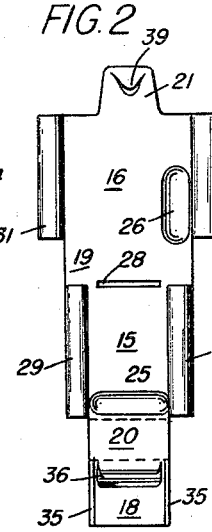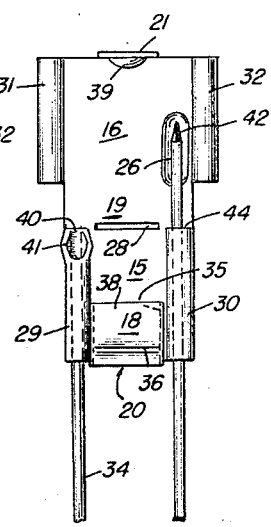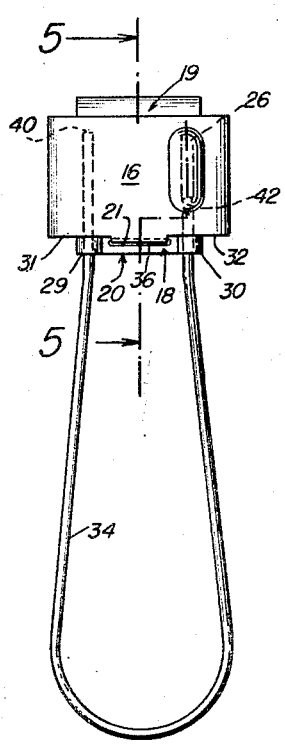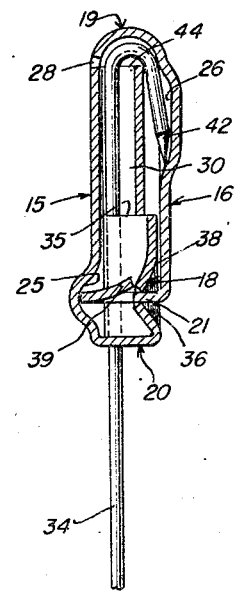
Feb. 18, 1958 — G. G. CANTER ET AL — 2,823,943
AUTOMATIC WIRE LOCK SEAL
Filed July 24, 1956 — 2 Sheets-Sheet 1
INVENTOR.
Gilbert G. Canter
George G. Canter
BY
Churchill, Rich, Weymouth & Engel
Attorneys Feb. 18, 1958
G. G. CANTER ET AL
2,823,943
AUTOMATIC WIRE LOCK SEAL
Filed July 24, 1956
2 Sheets-Sheet 2
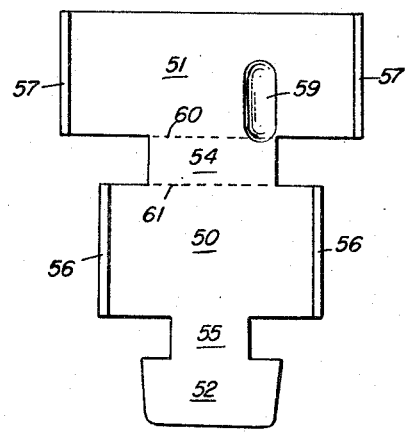
FIG. 6
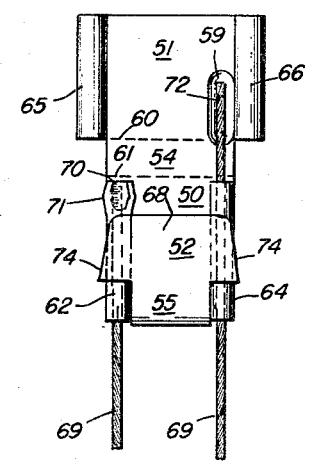
FIG. 7
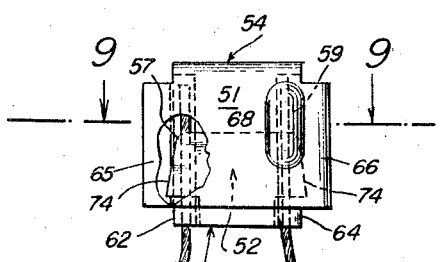
FIG. 8
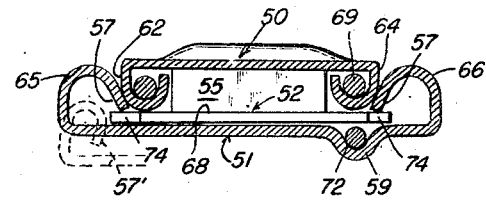
FIG. 9
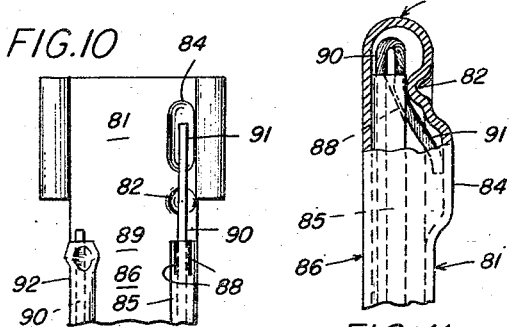
FIG. 10
FIG. 11
INVENTOR.
Gilbert G. Canter
George G. Canter
BY Churchill, Rich, Weymouth & Engel
Attorneys

2,823,943

AUTOMATIC WIRE LOCK SEAL

Gilbert G. Canter and George G. Canter,
New York, N. Y.

Application July 24, 1956, Serial No. 599,736

8 Claims. (Cl. 292—307)

This invention relates to an improved seal device for tagging meats, poultry and other food products, and for tagging clothing or other kinds of merchandise, articles or materials, or, if desired, the seal may be used for sealing containers and fastening devices or the like.

More particularly, the invention relates to seals in which the relatively movable parts will automatically lock to sealing position after being applied to the article to be sealed, and when in sealed or locked position cannot be opened without mutilation thereof to such a degree as will give clear evidence of tampering and render the seal unfit for further use.

An object of the invention is to provide a novel seal which may be formed from a length of wire and a single piece of metal bent to form the several elements of the seal, thereby providing an article which may be manufactured for comparatively small cost.

Another object is to provide an automatic wire lock seal which does not require the use of any tools for the application or locking thereof.

Another object is to provide a seal which cannot be opened without tearing and mutilating the same.

Other objects and advantages will be readily apparent from the following description of the novel features of construction, arrangement and combination of parts.

In the accompanying drawings, in which are shown various illustrative embodiments of the invention, Fig. 1 is a plan view of the blank from which one form of the seal may be made;

Fig. 2 is a plan view of the blank of Fig. 1 partially formed to produce the seal;

Fig. 3 is a plan view of the complete seal ready for use;

Fig. 4 is a plan view of the complete seal as locked;

Fig. 5 is an enlarged cross-sectional view taken on the line 5—5 of Fig. 4;

Fig. 6 is a plan view of a blank from which a modified form of the seal may be made;

Fig. 7 is a plan view of the blank of Fig. 6 formed into the complete seal ready for use;

Fig. 8 is a plan view of the last-mentioned form of the invention after the seal has been locked, parts being broken away to show details of construction;

Fig. 9 is an enlarged cross-sectional view taken on the line 9—9 of Fig. 8;

Fig. 10 is a fragmentary plan view of a complete seal ready for use and showing additional wire locking means usable with either form of the invention; and Fig. 11 is an enlarged fragmentary side view of a locked seal embodying the wire locking means of Fig. 10, parts being broken away to show details of construction.

In the embodiment of the invention illustrated in Figs. 1 to 5 inclusive, the seal body is formed from a single blank of sheet metal stamped to the configuration shown in Fig. 1. The seal comprises a housing section 15, a closure section 16, an inner locking section 18, and intermediate connecting sections 19 and 20. A locking tongue 21 is provided as an integral extension of closure section 16. Flanges 22 and 24 are initially formed on the longitudinal side margins of sections 15 and 16 respectively which are bent about 45° upwardly to facilitate further erection of the seal. Sections 15 and 16 are also provided respectively with generally oblong rounded depressions 25 and 26, and intermediate section 19 is optionally provided with a transverse slot 28, all for purposes to be described hereinafter.

Successive stages of formation of the complete seal ready for use are shown in Figs. 2 and 3. The marginal side portions of section 15 are rolled inwardly upon themselves, this being facilitated by the upwardly extending flanges 22, and over the inner face of said section to provide along the respective longitudinal sides of said section tubular wire coupling members 29 and 30. The marginal side portions of section 16 are similarly rolled to provide tubular closure walls 31 and 32. The bores of the coupling members 29 and 30 are diametrically sized freely to receive the end portions of a tie-wire 34. The bores of closure walls 31 and 32 may be similarly sized.

The marginal side portions of locking section 18 are bent to form upstanding side walls 35, 35. A transversely extending slot or aperture 36 of the shape shown is also formed in section 18 for a purpose to be described. Section 18 as thus formed is bent upwardly and over into the space between the coupling members 29 and 30, as shown in Fig. 3, to form a locking shelf 38 with its slot 36 disposed above the depression 25. The side walls 35 and the intermediate section 20 serve to space the locking shelf 38 from the inner face of section 15, section 20 also functioning as an end closure wall.

Locking tongue 21 is formed with a punched prong 39 and then bent upwardly into perpendicular relation to section 16 as shown in Fig. 3. The locking tongue and its prong 39 are adapted to be received within the aperture 36 of locking shelf 38 when the seal is closed.

The tie-wire 34 comprises a suitable length of flexible metallic wire or cable of suitable gauge, although it should be understood that a loop of cord or the like may be used advantageously with the present invention. The butt end 40 of the tie-wire is inserted through the tubular coupling 29 and is initially fixedly connected to the coupling 29 by crimping the coupling and its inserted tie-wire as shown, for example, at 41 in Fig. 3, thus securing the butt end of the tie-wire against outward displacement from the coupling member and consequent separation from the seal body. Initially, said tire-wire 34 extends straight out from the seal body to which it is attached. The outer free extremity of said wire may have a sharpened end 42 to facilitate piercing of the article on which the seal is used, for example meat products.

In the use of the seal as thus formed, the free end 42 of the wire is passed through the article to be sealed or tagged and thereupon doubled or looped back to oppose same to the coupling member 30 through which it is passed until the end 42 is disposed in depression 26, said depression being in axial alignment with coupling member 30. Closure section 16 is bent up slightly out of the plane of housing section 15 so that the point of the wire will strike the bottom and end of depression 26, which is protection against injury to the user. After the tie-wire is thus manipulated and operatively related to the seal body in use as shown in Fig. 3, the seal may be closed and locked as will now be described.

Closure section 16 is bent further upwardly and over into overlying spaced relation to housing section 15 as shown in Figs. 4 and 5, in which operation the locking tongue 21 and its prong 39 are received through the slot 36 of locking shelf 38, prong 39 being snapped through the slot 36 and engaged with the edge of said slot to effectively lock the seal and prevent it from being opened without mutilation. In this locked position the end of the locking tongue 21 is received in the depression 25.

During the locking operation, the tie-wire end 42, engaged in the depression 26, is bent as the section 16 is reversely bent to the position shown in Fig. 5, from which it will be seen that the tie-wire is effectively secured against being pulled out of coupling member 30, the wire end being hooked around the end 44 of the coupling member 30 and enclosed within the seal body. The locking operation does not require the use of any tools or special implements. The wire end 42 is inserted into the seal body which is then bent and locked merely by hand manipulation.

It will be seen that the seal cannot be opened except by mutilating or breaking the seal. The seal sections 19 and 20 form effective end closure walls, and the side closure of the seal is effected by the coupling members 29 and 30 and their respectively associated tubular closure walls 31 and 32. The width of the formed housing section 15 with its included coupling members 29 and 30 is only slightly less than the corresponding clearance between tubular closure walls 31 and 32 of closure section 16. Thus, in the locked condition of the seal, the coupling members 29 and 30 are received between and practically juxtaposed to their respectively associated tubular closure walls 31 and 32, thereby effectively preventing violation of the seal by means of a sharp instrument or the like. Moreover, the tubular construction of said coupling members and closure walls greatly strengthens them against violation or mutilation. In addition, the character of the sheet metal is preferably such that but one bending of the seal at the intermediate section 19 is possible without breaking. The transverse slot 28 in section 19 weakens the seal body transversely so that when the seal is bent reversely about section 19 the metal plate bends on the line of slot 28. Should it be pried open and rebent on this line, the metal would crack and the integrity of the seal would be irreparably and visibly destroyed.

It should be understood that the tie-wire or cord used with the seal may be irremovably secured by other methods. For example, either butt end 40, which need not initially be anchored by crimping its associated coupling member 29, or free end 42 of the tie wire 34, or both ends, may be manipulated in addition into tubular closure walls 31 and 32 respectively and reversely bent when the seal is folded and locked, thereby preventing withdrawal of the wire ends. Otherwise, the free end portion of the wire or cord may be wrapped transversely around the intermediate section 19 before bending and locking the seal. All methods are effective against tampering, although that illustrated in the drawings is preferred.

In the embodiment of the invention illustrated in Figs. 6 to 9, the seal is formed from a unitary blank of sheet metal as shown in Fig. 6, which is identical to the blank of Fig. 1 in the heretofore described form of the invention except in the omission of the locking tongue 21.

The blank of Fig. 6 includes a housing section 50, a closure section 51, an inner locking section 52 and intermediate connecting sections 54 and 55. Upwardly turned flanges 56 and 57 are formed on the longitudinal side margins of sections 50 and 51. A generally oblong rounded depression 59 is provided in section 51. The blank is optionally provided with scored or otherwise weakened lines 60 and 61 for the purpose described hereinafter.

The complete seal ready for use is shown in Fig. 7. The marginal side portions of section 50 are rolled inwardly to provide tubular wire coupling members 62 and 64. The marginal side portions of section 51 are also rolled inwardly, but for less than one whole turn, whereby the edges of flanges 57 are disposed inwardly a slight distance from the inner margins of section 51, as best shown in Fig. 9, to provide tubular side closure and locking walls 65 and 66. Intermediate section 55 is bent upwardly to form an end closure wall and a portion of said section 55 and locking section 52 are additionally bent over into overlying relation to coupling members 62 and 64 to provide a locking shelf 68. The tie-wire 69 is initially connected to the seal by inserting the butt end 70 of said wire into coupling member 62 and crimping said coupling member with its tie-wire as shown at 71. Tie-wire 69 is shown as a stranded wire or cable but obviously may be a solid wire if desired. The free end 72 of the wire 69 is passed through the article to be sealed or tagged and then passed through coupling member 64 until said free end is disposed above depression 59. Closure and automatic locking of the seal is accomplished in the manner to be described.

Referring to Figs. 8 and 9, the closure section 51 is bent upwardly and over section 50 and closed down on locking shelf 68 whereby the tubular locking walls 65 and 66 are engaged around the tapered edges 74 of the locking shelf 68 with a camming and snap action to automatically lock the seal in closed position, the intermediate section 54 forming an end closure wall. It will be noted that the longitudinal edges 74 of locking shelf 68 are so tapered that at least a portion of said shelf 68 is greater in widthwise dimension than the corresponding clearance between the tubular locking walls 65 and 66. Accordingly, when closure section 51 is pressed over locking shelf 68, the edges 57 of said walls 65 and 66 will be cammed over said tapered edges 74 and biased outwardly as shown in dotted lines at 57' in Fig. 9. Upon completing the closure, the edges 57 will snap inwardly back to normal position and into engagement with the tapered edges 74 of the locking shelf 68 as shown in solid lines in Fig. 9. The free end 72 of the wire 69 is irremovably locked in the seal in the same manner as in the heretofore described form of the invention, by being bent over the end of coupling member 64.

The only places in which a tool or knife blade may be inserted in the form of seal shown in Figs. 8 and 9 to force the seal are between tubular walls 62 and 65 and between walls 64 and 66. However, the character of the sheet metal and the scored or weakened lines 60 and 61 defining end wall 54 are so related that but one reverse bending of the seal causes the metal to crack and the integrity of the seal is visibly destroyed.

Figs. 10 and 11 are fragmentary views of a modified form of wire locking means usable with either form of the heretofore described embodiments of the invention. As shown, the closure section 81 is formed with a raised detent or dimple 82 in axial alignment with depression 84 in section 81 and with tubular coupling member 85 in housing section 86. Coupling member 85 is provided with longitudinal slits 88 in the end portion of said member adjacent detent 82.

The free end 91 of tie-wire 90 is disposed in the seal in the manner heretofore described, and upon the closure and locking of the seal by bending closure section 81 around connecting section 89, the detent 82 acts to crimp the free end 91 of the wire 90 against the slit portion of the coupling member 85. This crushes the coupling member 85 and collapses it at its weakened slit lines 88 and, as shown in Fig. 11, the coupling member 85 and its contained wire 90 are effectively crimped together, thereby additionally securing the free end 91 of wire 90 against withdrawal from coupling member 85. It is obvious that a detent corresponding to 82 may be located in axial alignment with coupling member 92 as well, this coupling member also being provided with slits, whereby both ends of the tie-wire 90 may be loosely inserted into the seal and secured against removal after the seal has been closed and locked.

In any of the forms of seal above described, but particularly when a stranded, very flexible wire as shown in Figs. 7 and 9 is used, the free end of the wire may be pulled through tube 64 or its counterpart to obtain a length of free end long enough to be wrapped one or more times around connecting section 54 before the seal is closed. This very effectively secures the free end and also enables the wire loop to be shortened to the desired size for the purpose of holding two parts together. Used in this manner, the seal is particularly adapted for use in sealing milk cans. If the seal is intended for use solely in this manner the depression 59 can be omitted as unnecessary.

It is to be understood that various changes in the details of construction of the embodiments described and illustrated may be made within the scope of the appended claims.

What is claimed is:

1. A seal comprising a sheet metal body and a flexible tie-wire associated therewith, said seal body including two interconnected sections bendable along a transverse line therebetween, said sections having means integral therewith for automatically locking them together when said two sections are brought together by bending along said transverse line, one of said sections having one longitudinal marginal portion thereof rolled inwardly thereupon to provide a tubular wire coupling member, said tie-wire having one end portion anchored to said one section and being adapted to be bent upon itself for insertion of its initially free end portion through said coupling member, said free end portion of said wire protruding across said transverse line and being received over the inner face of the other seal body section, whereby upon closure of said seal body by bending said sections along said transverse line said protruding end portion of said wire is reversely bent upon itself and crimped into interlocking relation with said coupling member to secure said wire against removal.

2. A seal according to claim 1, wherein said other seal body section is formed with an indent pressed outwardly from said section and opposed to the adjacent end of the coupling member to receive the free end portion of the tie-wire before bending the seal sections.

3. A seal according to claim 1, wherein said other seal body section is formed with a dimple pressed inwardly of said section and opposed to the adjacent end of the coupling member, whereby upon closure of the seal said dimple engages and crimps the reversely bent portion of the wire and said adjacent end of said coupling member.

4. A seal according to claim 3, wherein the said adjacent end portion of the coupling member is provided with at least one longitudinal slit whereby the crushing of said end portion by the detent upon closure of the seal is facilitated.

5. A seal comprising a sheet metal body and a flexible tie-wire associated therewith, said seal body including two interconnected sections bendable along a transverse line therebetween, said sections having means integral therewith for automatically locking them together when said sections are brought together by bending along said transverse line, one of said sections having the longitudinal marginal portions thereof rolled inwardly thereupon to provide tubular wire coupling members, said tie-wire having one end portion inserted through one coupling member and secured therein, the other end portion being adapted for insertion through the other coupling member, said other end portion of said wire when inserted protruding across said transverse line and over the other seal body section, whereby upon closure and locking of said seal body by bending said sections along said line said other end portion of said wire is reversely bent upon its associated coupling member and secured against removal from said coupling members.

6. A seal body according to claim 5, wherein said other seal body section has its longitudinal marginal portions rolled inwardly thereupon to provide tubular closure walls adapted to lie outside of and parallel to said tubular coupling members upon closure of the seal body.

7. A seal comprising a sheet metal body and a flexible wire associated therewith, said seal body including a pair of sections and an intermediate bendable connecting portion between said sections, whereby said sections may be bent about said intermediate bendable portion and pressed together, each of said sections having the longitudinal marginal portions thereof rolled inwardly thereupon to provide a pair of parallel tubular side walls, the parallel walls of one of said sections being adapted to be received within the parallel walls of the other of said sections and being diametrically sized to receive the end portions of said wire, one end portion of said wire being inserted and anchored in one tubular side wall of said one section, the other end portion of said wire being passed for locking through the other wall of said one section and extended across said intermediate bendable portion and being disposed over the inner face of said other section, whereby upon closure of the seal said extended wire end is reversely bent back upon its associated tubular wall to prevent withdrawal of said wire end.

8. A seal according to claim 7, wherein the said one section is provided with an end wall having an inwardly directed portion terminating in a transversely disposed shoulder the longitudinal marginal portions of which extend beyond the side walls of said one section, and the inwardly rolled side walls of the said other section are terminated in inwardly directed flange portions, the transverse clearance between the edges of said flange portions being slightly less than the corresponding dimension of said shoulder, said flanges being adapted to be snapped over the longitudinal edges of said shoulder to retain said sections against separation after said sections have been pressed together.

References Cited in the file of this patent

UNITED STATES PATENTS

| 1,631,464 | Brooks | June 7, 1927 |
| 1,791,342 | Behrman | Feb. 3, 1931 |
| 1,847,552 | Brooks | Mar. 1, 1932 |
| 1,916,448 | Thomson et al. | July 4, 1933 |
| 2,189,026 | Dietze | Feb. 6, 1940 |
| 2,227,569 | Brooks | Jan. 7, 1941 |
| 2,662,789 | Stoffel | Dec. 15, 1953 |